ABORT

United States Patent
Ochiai et al.

[15] 3,653,309
[45] Apr. 4, 1972

[54] PHOTOGRAPHIC CAMERA HAVING ONE OR MORE DETACHABLE MAGAZINES

[72] Inventors: Kohei Ochiai, Tokyo; Kiyoakira Kato, Chiba, both of Japan

[73] Assignee: Olympus Optical Co., Ltd., Tokyo, Japan

[22] Filed: Apr. 7, 1970

[21] Appl. No.: 26,352

[30] Foreign Application Priority Data

June 14, 1969 Japan..................................44/47223
June 17, 1969 Japan..................................44/47746

[52] U.S. Cl..................................................95/24, 95/26
[51] Int. Cl...................................................G03b 19/10
[58] Field of Search...........................95/24, 26, 30, 13, 19

[56] References Cited

UNITED STATES PATENTS

| 458,907 | 9/1891 | Kipper et al. | 95/19 |
| 2,602,386 | 7/1952 | Brigham et al. | 95/26 |
| 1,557,085 | 10/1925 | Piller | 95/30 |

*Primary Examiner*—Samuel S. Matthews
*Assistant Examiner*—Richard L. Moses
*Attorney*—Otto John Munz

[57] ABSTRACT

Photographic camera having a view finder and a detachable film cassette and comprising film feed means for automatically feeding film sheets in the cassette to the film exposure frame one by one after the exposure thereof and for returning the respective exposed film sheets to the same cassette or to another cassette detachably mounted on the camera. The film feed means is energized by the operation of a handle thereof and comprises roll means driven by the energization of the film feed means for feeding and guiding the film sheets.

6 Claims, 22 Drawing Figures

INVENTORS
KOHEI OCHIAI, KIYOAKIRA KATO

BY
ATTORNEY

Patented April 4, 1972

INVENTORS
KOHEI OCHIAI, KIYOAKIRA KATO

BY
ATTORNEY

Patented April 4, 1972

INVENTORS
KOHEI OCHIAI, KIYOAKIRA KATO

BY
ATTORNEY

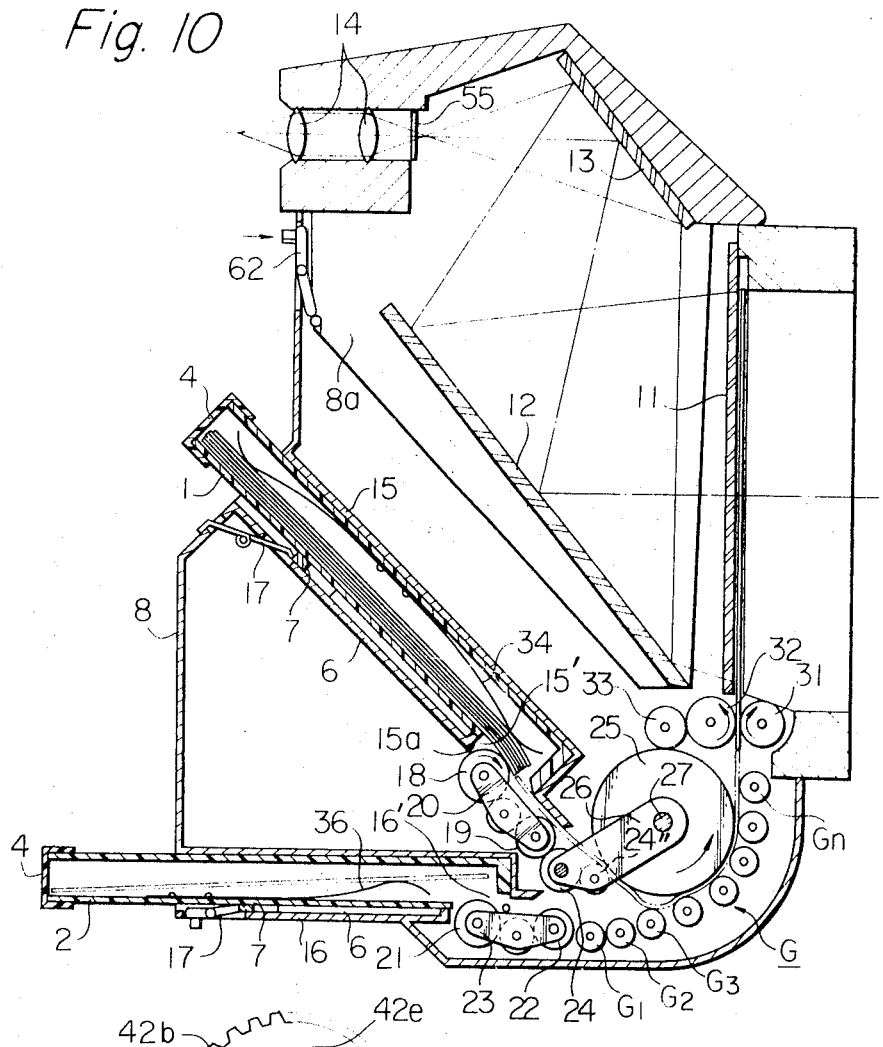
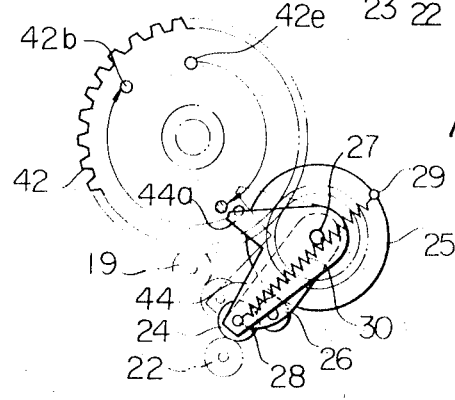

Patented April 4, 1972

INVENTORS
KOHEI OCHIAI, KIYOAKIRA KATO

BY
ATTORNEY

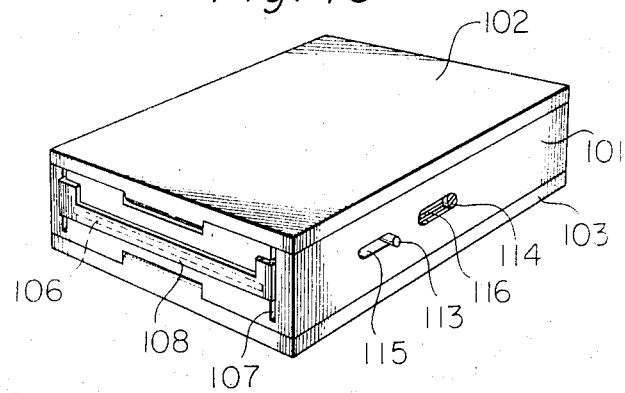
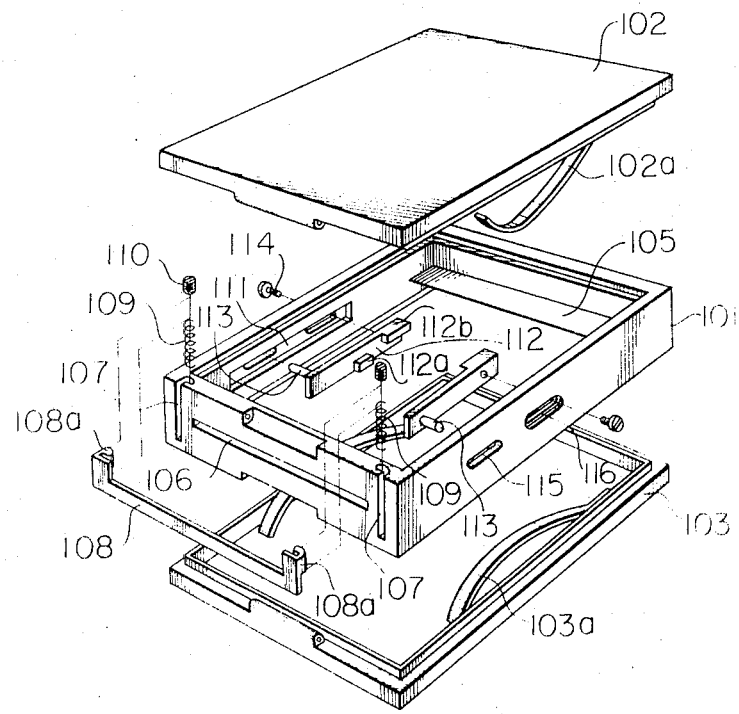

Patented April 4, 1972 3,653,309

INVENTORS
KOHEI OCHIAI, KIYOAKIRA KATO

BY
ATTORNEY

PHOTOGRAPHIC CAMERA HAVING ONE OR MORE DETACHABLE MAGAZINES

BACKGROUND OF THE INVENTION

The present invention relates to a photographic camera having a detachable film cassette containing therein a plurality of unexposed film sheets to be fed in the camera for the exposure thereof by the actuation of shutter release means of the camera, and more particularly, to a photographic camera of the type described above having film feed means provided with a manually operable handle for energizing the film feed means by which the respective film sheet is fed automatically to the film exposure frame in the camera by the actuation of an actuating member of the film feed means and fed out of the film exposure frame by the actuation of another actuating member of the film feed means prior to the actuation of the handle for energizing the film feed means or directly by the actuation of the handle for energizing the film feed means. Heretofore, a photographic camera having a detachable film cassette was well known. In the prior art photographic camera of the type described above, troublesome manual operation is required each time the exposure of the film sheet is effected. Further, the prior art detachable film cassette must be disposed of after all the film sheets therein are exposed thereby making it uneconomical to use such a film cassette.

The present invention aims at avoiding the disadvantages of the prior art photographic camera having a detachable film cassette.

SUMMARY OF THE INVENTION

An object of the present invention is to provide a novel and useful photographic camera having a detachable cassette in which the above described disadvantages of the prior art are eliminated.

Another object of the present invention is to provide a novel and useful photographic camera of the type described above in which each of the film sheets in the cassette is automatically fed to an exposure frame in the camera for the exposure thereof and fed out of the exposure frame after the exposure of the film sheet effected by shutter release means by means of a film feed means provided in the camera so as to be ready for the exposure of the succeeding one of the film sheets.

A further object is to provide a novel and useful photographic camera of the type described above in which a separate detachable film cassette is provided for receiving the exposed film sheets.

Still further object is to provide a novel and useful photographic camera of the type described above in which a single detachable film cassette is provided, the cassette having two compartments in one of which the unexposed film sheets are housed while the other compartment is adapted to receive the film sheets after the exposure thereof thereby permitting the handling of the cassette to be made easy and simple.

The above objects of the present invention are achieved by the provision of a photographic camera having a detachable film cassette which is characterized by film feed means having a manually operable handle for energizing the film feed means each time the handle is actuated so as to permit one of a plurality of unexposed film sheets housed in the cassette to be fed to the film exposure frame of the camera by the actuation of an actuating member of the film feed means, the film sheet, after having been exposed, being adapted to be withdrawn from the exposure frame so as to be ready for the feeding of the succeeding one of the film sheets to the exposure frame for the exposure thereof.

In accordance with a feature of the present invention, the exposed film is withdrawn from the exposure frame by the actuation of another actuating member of the film feed means prior to the energization of the film feed means so as to be fed into another film cassette detachably mounted on the camera for receiving the exposed film sheets.

In accordance with a further feature of the present invention, the respective unexposed film sheets are fed out of one of the two compartments in the film cassette for the exposure thereof by the actuation of the actuating member and the respective exposed film sheets are fed into the other of the two compartments of the film cassette by the actuation of the handle for energizing the film feed means so as to be ready for feeding the succeeding one of the film sheets for the exposure thereof.

BRIEF DESCRIPTION OF THE DRAWINGS

FIG. 10 is a schematic sectional view of the camera of FIG. 1 showing the arrangement of the various elements of the film feed means of FIG. 6;

FIG. 11 is a fragmentary view showing the actuation of the switching lever in cooperation with the actuating gear of FIG. 9;

FIG. 16 is a perspective view showing the film cassette used with the camera of FIG. 14;

FIG. 17 is an exploded perspective view showing the interior of the cassette of FIG. 16;

DETAILED DESCRIPTION OF THE PREFERRED EMBODIMENTS

Figure 1:
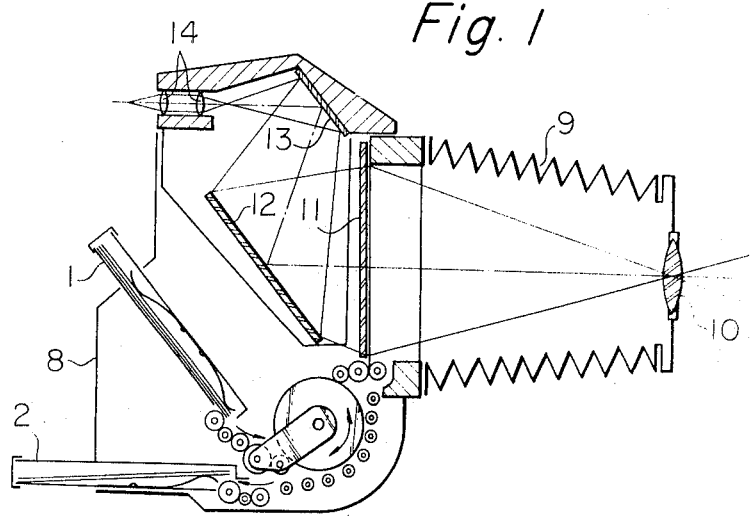
FIG. 1 is a schematic side view partly in section showing an embodiment of the photographic camera constructed in accordance with the present invention.
Figure 2:
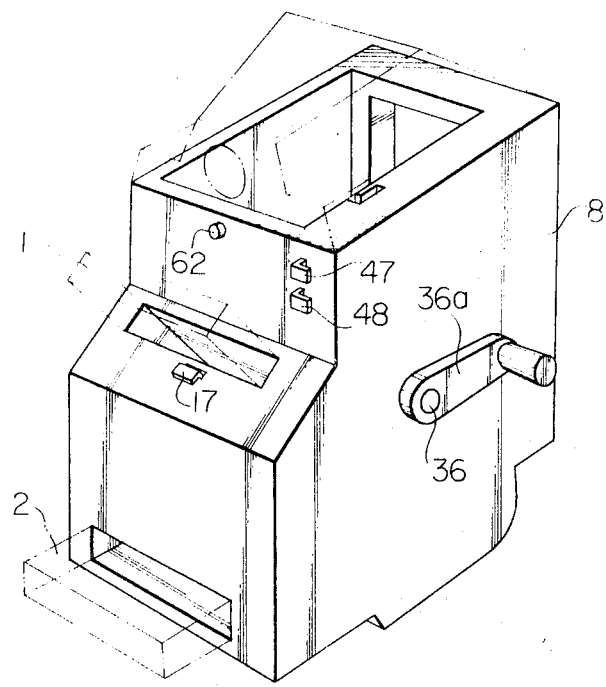
FIG. 2 is a perspective view showing the camera of FIG. 1.

Referring to FIG. 1, the camera of the present invention is shown as being a single lens reflex camera having main body 8, bellows 9 mounted on body 8, objective lens 10 attached to the forward end of bellows 9 and detachable view finder 14 detachably mounted on body 8 and adapted to receive the light from the object by stationary reflecting mirrors 12, 13 secured in the body 8. A ground glass plate 11 for focusing an image of the object by means of objective lens 10 is secured in the body 8.

In accordance with the present invention a film supplying cassette 1 housing therein a plurality of unexposed film sheets and a film receiving cassette 2 are detachably mounted on main body 1 as shown in FIG. 1 so as to supply and feed the film sheets one by one from cassette 1 to the position in front of glass plate 11 for the exposure thereof by means of shutter release means and receive the exposed film sheets one by one in cassette 2 by the actuation of the film feed means provided in body 8 as described below.

Figure 3:
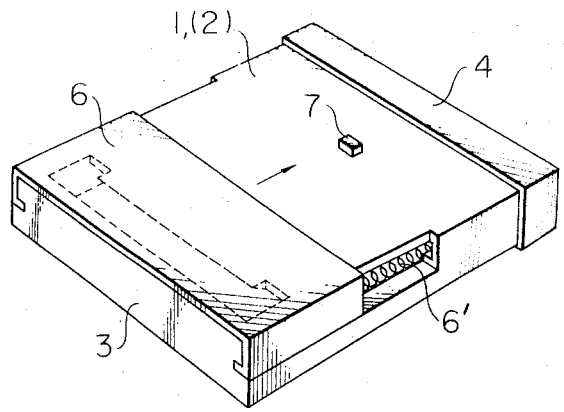
FIG. 3 is a perspective view showing the film cassette used with the camera of FIG. 1.
Figure 4:
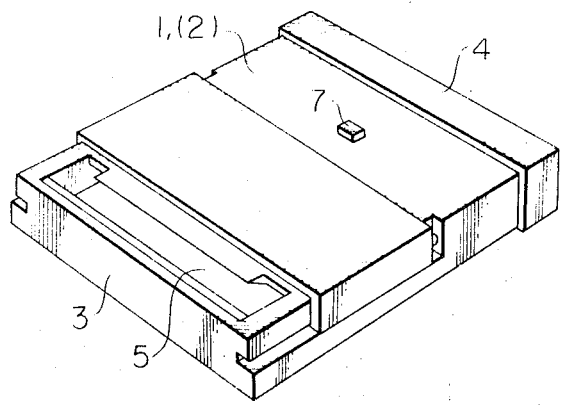
FIG. 4 is a view similar to FIG. 3 but showing the movable lid thereof in its opened state.
Figure 5:
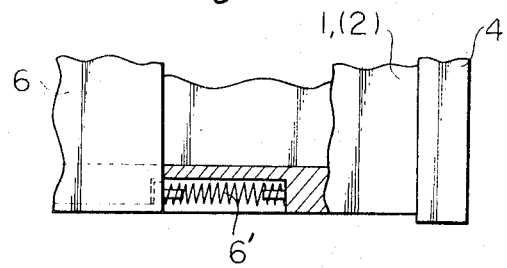
FIG. 5 is a fragmentary side view showing the detail of the lid and the cassette of FIG. 3.

In FIGS. 3 to 5, film supplying cassette 1 and film receiving cassette 2 are shown as being substantially in the same configuration with each other except that film supplying cassette 1 is provided with leaf spring 34 as shown in FIG. 10 while film receiving cassette 2 is provided with leaf spring 35 as shown in FIG. 10. Cassette 1, 2 is of a rectangular form with its one end closed by stationary end plate 3 while the opposite end is opened and covered by lid 4 detachably mounted on the open end of cassette 1, 2. A plurality of unexposed film sheets are inserted into film supplying cassette 1 through the open end and thereafter the open end is closed by lid 4. An opening 5 is provided in one side surface of cassette 1, 2 adjacent to end plate 3 as shown for supplying the unexposed film sheets one by one into body 8 therethrough for the exposure thereof when cassette 1 is mounted on body 8. Movable lid 6 is slidably mounted on cassette 1, 2 so as to be allowed to move between a position closing opening 5 and a position at which opening 5 is opened. Springs 6' are provided between inner end surface of lid 6 and the abutment surface of cassette 1, 2 as shown in FIGS. 3 and 5 so that lid 6 is normally urged to the position at which opening 5 is closed. A stopper 7 is formed in the side surface of cassette 1, 2 as shown in FIGS. 3 and 4, the operation of which will be described later.

Body 8 is provided with guide recess 15 for receiving film supplying cassette 1 as shown in FIG. 10, recess 15 extending into body 8 from about the midpoint of the rear wall of body 8 downwardly. Recess 15 is provided with opening 15' coinciding with opening 5 of cassette 1 when the same is fitted in recess 15 in position. Abutment piece 15a is provided at one edge of opening 15' of recess 15 so that lid 6 abuts against piece 15a when cassette 1 is inserted into recess 15 thereby moving lid 6 against the action of springs 6' rearwardly to clear opening 5 so as to communicate the interior of cassette 1 with the interior of body 8 through openings 5 and 15'. Spring biased operating lever 17 engages with stopper 7 of cassette 1 and prevents cassette 1 from being withdrawn from recess 15 unless lever 17 is manually actuated against the action of the spring of lever 17 to disengage lever 17 from stopper 7.

The stacked unexposed film sheets are loaded in cassette 1 with their emulsion bearing surfaces facing downwardly and biased by spring 34 downwardly toward the side wall of cassette 1 in which opening 5 is provided.

In like manner, recess 16 is provided in body 8 for receiving film receiving cassette 2 as shown in FIG. 10, recess 16 extending into body 1 from the lower portion of the rear wall of body 1 substantially horizontally. Opening 16' is formed in recess 16 in coincidence with opening 5 of cassette 2.

Figure 6:
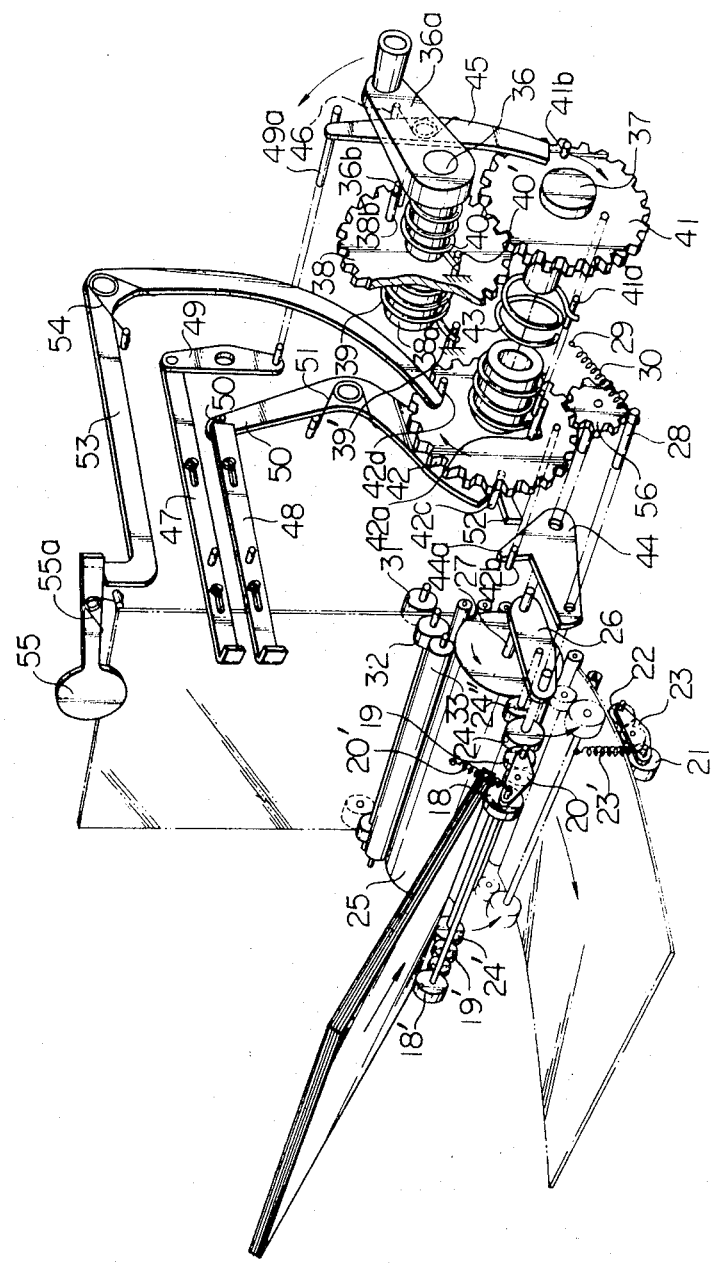
FIG. 6 is a schematic perspective view showing the general arrangement of the film feed means provided in the camera of FIG. 1.
Figure 7:
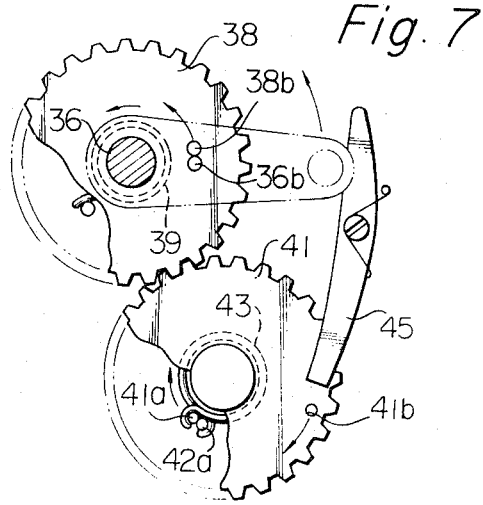
FIG. 7 is a fragmentary view showing the arrangement of the driving gear and the driven gear provided in the film feed means of FIG. 6.

A first roll train 18, 19 consisting of odd number of rolls contacting with each other so as to rotate together and each rotatably supported by swingable lever 20 is located adjacent to opening 15' near one end thereof as shown in FIGS. 6, 10. Swingable lever 20 is pivotally mounted in body 8 at about its midpoint and biased by spring 20' in the clockwise direction as seen in FIG. 10, so that roll 18 is biased against recess 15 of the inner edge portion of the lowermost film sheet in cassette 1. As shown in FIG. 6, another roll train 18', 19' similar to first roll train 18, 19 is located adjacent to the opposite end of opening 15' and each of the rolls in the train is connected to the corresponding roll of roll train 18, 19 by the shaft, so that roll trains 18, 19; 18', 19' are arranged in symmetry with respect to the longitudinal center line of cassette 1 and moved together.

In like manner a second roll train 21, 22 similar to roll train 18, 19 and supported by swingable lever 23 is located adjacent to opening 16' near one end thereof. Lever 23 is biased in the clockwise direction by means of spring 23' shown in FIG. 6 so that roll 21 is urged upwardly. Another roll train similar to roll train 21, 22 is located at the opposite end of opening 16' and each of the rolls in the train is connected to the corresponding roll of roll train 21, 22 so that they are arranged in symmetry with respect to the center line of the cassette 2 and moved together.

A major roll 25 is rotatably supported in body 8 by shaft 27 secured to roll 25 as shown in FIG. 10. Shaft 27 rotatably supports switching arms 26 at opposite ends of major roll 25 and switching roll 24, 24' are rotatably mounted at the free end of respective switching arms 26. Idle rolls 24" are rotatably mounted on arms 26 and contact with major roll 25 and respective switching rolls 24, 24' so that switching roll 24, 24' are rotated in the same direction as that of major roll 25 when the same is rotated.

Switching rolls 24, 24' are contacted with rolls 19, 19', respectively, when arms 26 are swung in the clockwise direction, while they are contacted with roll 22 of roll train 21, 22 and the corresponding roll of the corresponding roll train, respectively, when arms 26 are swung in the anticlockwise direction.

A set of feeding roll trains 31, 32, 33, each of which roll train consists of odd number of rolls, is located adjacent to the lower end of glass plate 11 with roll 33 contacting with major roll 25 so that each roll is rotated when major roll 25 is rotated. Rolls 31, 32 are positioned so that a film sheet fed therebetween is located immediately in front of glass plate 11 so that the film sheet is fed in front of glass plate 11. A set of guiding roll trains G consisting of rolls $G_l$ –$G_n$ is located around major roll 25 with rolls $G_l$ located adjacent to roll 22 of roll train 21, 22 and the corresponding roll of the corresponding roll train, while rolls $G_n$ are located adjacent to rolls 31 of feeding roll trains 31, 32 33, so that the film sheet is guided around major roll 25 from cassette 1 toward glass plate 11 and guided back toward cassette 2.

Now, the mechanism for driving major roll 25 will be described in connection with FIG. 6.

Body 8 is provided outer and inner side walls defining compartments therebetween, respectively. In the right hand compartment as seen in FIG. 6, upper shaft 36 and lower shaft 37 are journaled in parallel to each other and an exterior manually operable crank handle 36a is fixed to the outer end of shaft 36. Shaft 36 loosely mounts thereon hub 38a of driving gear 38. A right-handed coil spring 39 is provided around hub 38a with its one end secured to pin 39' secured to a stationary portion of body 8 while the other end is secured to hub 38a. Another right-handed coil spring 40 is provided around shaft 36 at the side of gear 38 opposite to that at which spring 39 is provided. One end of spring 40 is secured to pin 40' secured to a stationary portion of body 8 while the other end is secured to shaft 36.

Gear 38 is provided with pin 38b which is engageable with the bent tip of pin 36b secured to shaft 36 so that gear 38 is rotated in the anticlockwise direction when handle 36a is manually rotated in the anticlockwise direction so as to energize spring 39, while, at the same time spring 40 is energized.

Driven gear 41 is fixedly secured to shaft 37 and meshed with gear 38. Shaft 37 rotatably mounts thereon actuating gear 42. Left-handed coil spring 43 is provided around the hub of gear 42 with its one end being secured to pin 42a fixed to gear 42 while the other end is secured to pin 41a fixed to gear 41, pin 41a being arranged so as to be engageable with pin 42a of gear 42.

A driving pinion 56 is fixed to shaft 27 which is integral with major roll 25 so that the same is driven in either of two directions depending upon the direction of rotation of actuating gear 42.

Pin 42c fixedly secured to gear 42 is adapted to abut a stopper 52 secured to body 8. Swingable lever 50 is pivoted at its intermediate portion to body 8 and biased by spring 51 in the anticlockwise direction. An actuating member 48 is slidably mounted on the side wall of body 8 to move a limited amount by slot-pin engagement as shown, the outer end thereof protruding exterior of body 8 so that member 48 is manually operated by the outer end. Pin 50a secured to the upper end of lever 50 abuts against the inner end of member 48 so that member 48 is normally urged outwardly by the action of spring 51 while the lower end of lever 50 abuts against pin 42c so that pin 42c is arrested between stopper 52 and the lower end of lever 50 so as to prevent the rotation of gear 42. When member 48 is manually moved inwardly, lever 50 is rotated in the clockwise direction against the action of spring 51 so that the lower end of lever 50 is disengaged from pin 42c to permit gear 42 to rotate in the clockwise direction.

A swingable lever 45 is pivoted at its intermediate portion to body 8 and biased by a spring in the clockwise direction so as to normally abut against stopper pin 46 secured to body 8 to limit the rotation of lever 45. The lower end of lever 45 is in the path of movement of pin 41b secured to gear 41 when lever 45 abuts against stopper pin 46, so that the anticlockwise rotation of gear 41 is prevented when pin 41b abuts against the lower end of lever 45.

Another actuating member 47 is slidably mounted on the wall of body 8 to move a limited amount by slot-pin engagement and the outer end thereof protrudes exterior of body 8 so that member 47 is actuated manually by the outer end thereof. The upper end of swingable lever 49 pivoted to body 8 at its intermediate portion is pivoted to the inner end of member 47 and the lower end of lever 49 is provided with pin 49a secured thereto. Pin 49a abuts against the upper end of lever 45 so that member 47 is normally urged outwardly by the action of the spring biasing lever 45 in the clockwise direction, while, when member 47 is manually urged inwardly, lever 45 is rotated in the anticlockwise direction against the action of the spring of lever 45 by the interposition of lever 49 having pin 49a so that the lower end of lever 45 moves out of the path of movement of pin 41b of gear 41 thereby permitting gear 41 to rotate in the anticlockwise direction without the hindrance given by lever 45.

A mask plate 55 having an elongated stem is pivotally mounted on body 8 at the intermediate portion of the stem and biased by spring 55a in the anticlockwise direction so that mask plate 55 intercepts the optical path of view finder 14 to prevent the stray light harming the proper exposure of the film sheet from entering body 8 through view finder 14.

Lever 53 in the form of a bell-crank is pivoted at its bent portion to body 8 and biased in the anticlockwise direction by spring 54. The bent portion of the upper end of lever 53 is located in the path of movement of the outer end of the stem of mask plate 55 while the lower end of lever 53 is located in the path of movement of pin 42d fixedly secured to gear 42 so that, in the position shown in FIG. 6 in which pin 42c is arrested between stopper 52 and the lower end of lever 50, lever 53 is urged in the clockwise direction by pin 42d against the action of spring 54 so that the upper end of lever 53 urges the outer end of the stem of mask plate 55 upwardly to move mask plate 55 out of the light path of view finder 14 thereby permitting the image of the object formed in glass plate 11 to be viewed through view finder 14. When gear 42 is rotated in the clockwise direction, pin 42d is disengaged from the lower end of lever 53 so that lever 53 is rotated in the anticlockwise direction by the action of spring 54 so as to move mask plate 55 into the light path of view finder 14 by the action of spring 55a to intercept the stray light entering body 8 therethrough.

A switching lever 44 is rotatably mounted on shaft 27. Shaft 28 of roll 24 extends outwardly beyond switching arm 26 and passes through an opening formed in the free end of lever 44 so that switching arm 26 and switching lever 44 is rotated together. As shown in FIGS. 6, 8, 9 and 11, one end of tension spring 30 is secured to the outer end of shaft 28 while the other end is secured to a stationary point 29 in body 8 located substantially opposite to the position of shaft 28 with respect to shaft 27 so that, when switching lever 44 is rotated in the clockwise direction, spring 30 urges switching lever 44 in the clockwise direction together with switching arm 26 so that rolls 24, 24' are urged to contact with rolls 19, 19' of the set of first roll trains 18, 19; 18', 19', while, when switching lever 44 is rotated in the anticlockwise direction over the dead point of spring 30, switching lever 44 is urged in the anticlockwise direction together with switching arm 26 by the action of spring 30 to move rolls 24, 24' apart from rolls 19, 19' and contact with roll 22 and the corresponding roll of the set of second roll train 21, 22 and the corresponding roll train.

Figure 9:
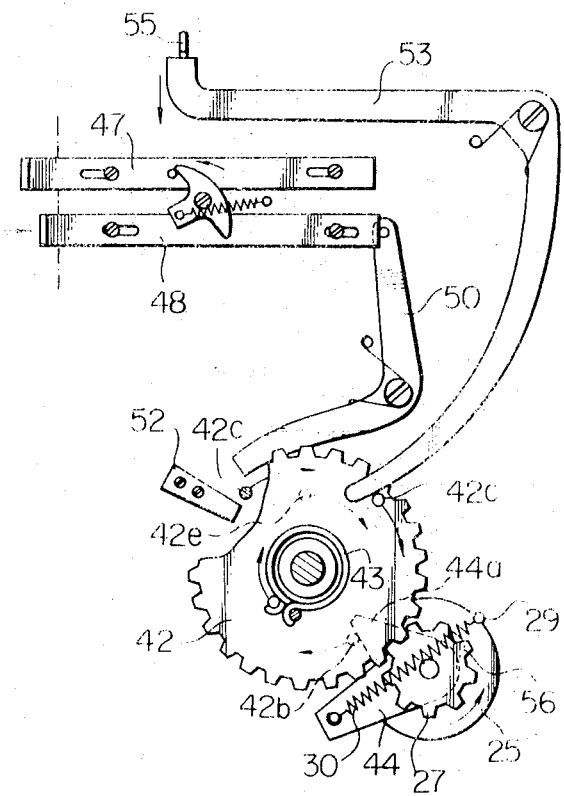
FIG. 9 is a schematic view showing the arrangement of the actuating members and the actuating gear and the driving pinion of the film feed means of FIG. 6.
Figure 12:
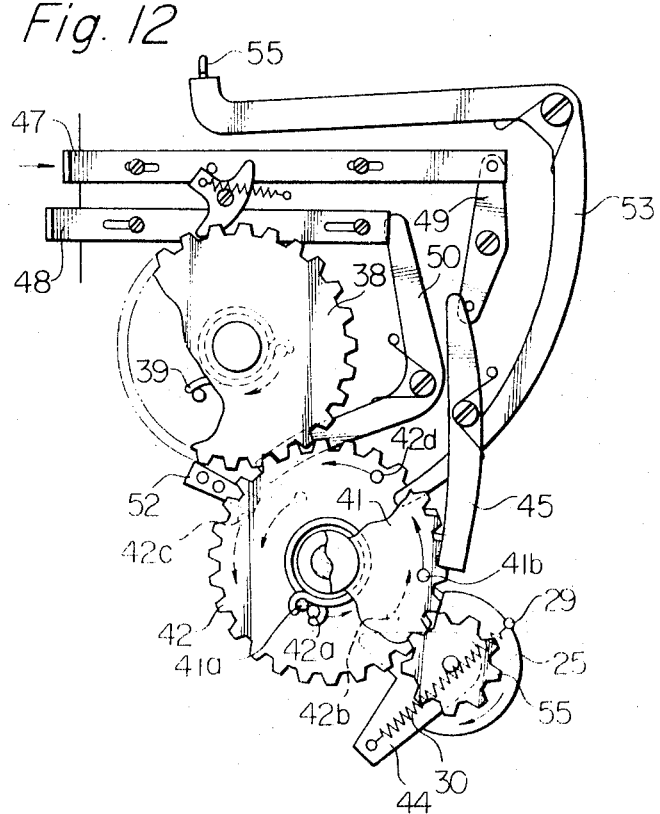
FIG. 12 is a view similar to FIG. 8 but showing the different phase in operation of the film feed means of FIG. 6.
Figure 13:
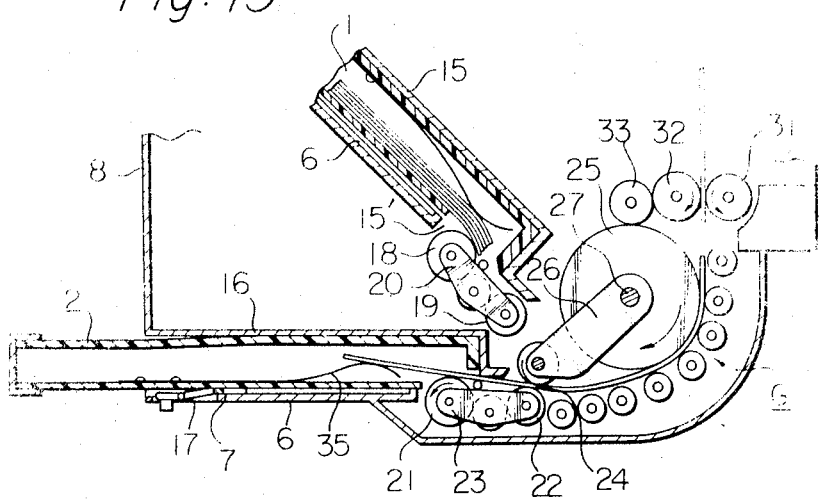
FIG. 13 is a fragmentary view showing the manner in which the exposed film sheet is fed into the film receiving cassette of FIG. 3.

As shown in FIGS. 6, 9 and 11, switching lever 44 is provided with projection 44a which is so located in the path of movement of pin 42b fixedly secured to gear 42. The angular position of pin 42b is so determined that, when gear 42 rotates in the clockwise direction from the position shown in FIG. 6, pin 42b abuts against the opposite side of projection 44a at about a complete revolution of gear 42 so that switching lever 44 is rotated in the anticlockwise direction beyond the dead point of spring 30 thereby contacting rolls 24, 24' with roll 22 of second roll train 21, 22 and the corresponding roll, respectively, while switching lever 44 is rotated in the clockwise direction when gear 42 is rotated in the anticlockwise direction to its initial position shown in FIG. 6 by the abutment of pin 42b against projection 44a so as to move rolls 24, 24' to contact with rolls 19, 19', respectively.

The operation of the above described film feed means is as follows. Starting with the position shown in FIG. 6 in which an exposed film sheet has been fed in cassette 2 and no film sheet is fed to the front surface of glass plate for the exposure thereof, handle 36a is first rotated manually in the anticlockwise direction so that spring 40 is energized. Then gear 38 is driven in the same direction by the engagement of pin 38a with pin 36b so that spring 39 is also energized while gear 41 meshing with gear 38 is driven in the clockwise direction to energize spring 43, because gear 42 is prevented its rotation by pin 42c arrested between stopper 52 and the lower end of lever 50. As gear 41 rotates about one revolution, pin 41b contacts lever 45 to move the same in the anticlockwise direction and, when pin 41b moves beyond the lower end of lever 45, lever 45 returns to its initial position by the action of the spring thereof so that gear 41 which is now urged in the clockwise direction by the energization of spring 43 is prevented from rotating in the clockwise direction by the abutment of pin 41b against the lower end of lever 45. Now, the film feed means is ready for the operation.

In order to feed a film sheet for the exposure thereof, actuating member 48 is manually moved inwardly to rotate lever 50 in the clockwise direction so that the lower end of lever 50 is disengaged from pin 42c of gear 42 thereby permitting gear 42 to be rotated in the clockwise direction by the energization of spring 43 until pin 42c abuts aginst the opposite side of stopper 52, while spring 39 is held energized by the arresting of gear 41 by pin 41b abutting against the lower end of lever 45. Thus, pinion 56 meshing with gear 42 is rotated in the anticlockwise direction together with major roll 25. Since rolls 24, 24' remain in contact with rolls 19, 19' of the set of first roll trains, respectively, rolls 18, 18' is driven and move the lowermost film sheet in the stack in cassette 1 out of cassette 1. Thus, the film sheet is fed around major roll 25 in cooperation with guide roll train G toward feeding roll trains 31, 32, 33 and nipped between rolls 31, 32 so as to be fed in front of glass plate 11 for the exposure of the film sheet. At about the end of one revolution of gear 42, pin 42b abuts against projection 44a of switching lever 44 thereby switching the same to disengage rolls 24, 24' from rolls 19, 19' and contact them with roll 22 and the corresponding roll, respectively, to be ready for feeding the exposed film sheet into cassette 2 by means of second roll train 21, 22 and the corresponding roll train. When gear 42 is rotated substantially by one revolution and stopped by the abutment of pin 42c against stopper 52, rotation of major roll 25 is stopped and, hence, feed rolls 31, 32, rolls 18, 18' are stopped so that the fed film sheet is held in position in front of focusing glass plate 11 for the exposure thereof.

When gear 42 rotates in the clockwise direction, pin 42d is disengaged from lever 53 so as to cause the same to be swung in the anticlockwise direction by the action of spring 54 so that mask plate 55 moves to intercept the light path of view finder 14. This prevents the stray light from entering body 8 through view finder 14 so that a proper exposure of the film sheet is insured without hindrance of the stray light.

After the film sheet is exposed by releasing shutter release means not shown, the exposed film sheet is withdrawn from the position in front of glass plate 11 and fed back into cassette 2 by manually moving actuating member 47 inwardly.

The inward movement of member 47 causes lever 45 to be rotated in the anticlockwise direction by the abutment of pin 49a of lever 49, so that pin 41b of gear 41 is disengaged from lever 45 thereby causing gear 41 to be rotated in the anticlockwise direction by the force of spring 39 which has been kept energized. The anticlockwise rotation of gear 41 causes gear 42 to be rotated in the same direction by the engagement of pin 41a of gear 41 with pin 42a of gear 42. Thus, pinion 56 meshing with gear 42 is rotated in the clockwise direction together with major drum 25, so that the exposed film sheet nipped by rolls 31, 32 is fed back along guide roll trains G toward second roll train 21, 22 now engaging with rolls 24, 24' thereby permitting the film sheet to be introduced in cassette 2. At the end of about one rotation of gear 42, pin 42c again abuts against stopper 52 and arrested between the same and the lower end of lever 50 by the action of spring 51, while pin 42b abuts against projection 44a of lever 44 so that the same is again switched to cause rolls 24, 24' to contact with rolls 19, 19' of the set of first roll trains 18, 19; 18', 19' to be ready for feeding a new film sheet out of cassette 1. At the same time, pin 42d abuts against lever 53 to swing it in the clockwise direction so that mask plate 55 is swung out of the light path of view finder 14 to permit the image of the object to be viewed therethrough.

Thus, the operation can be started by rotating handle 36a in the anticlockwise direction as already described. Handle 36a is returned to its initial position by energization of spring 40.

In accordance with a feature of the present invention, safety means is provided to prevent erroneous operation by the operator of actuating member 47 prior to the actuation of actuating member 48 after springs 39, 43 have been energized by the operation of handle 36a.

Figure 8:
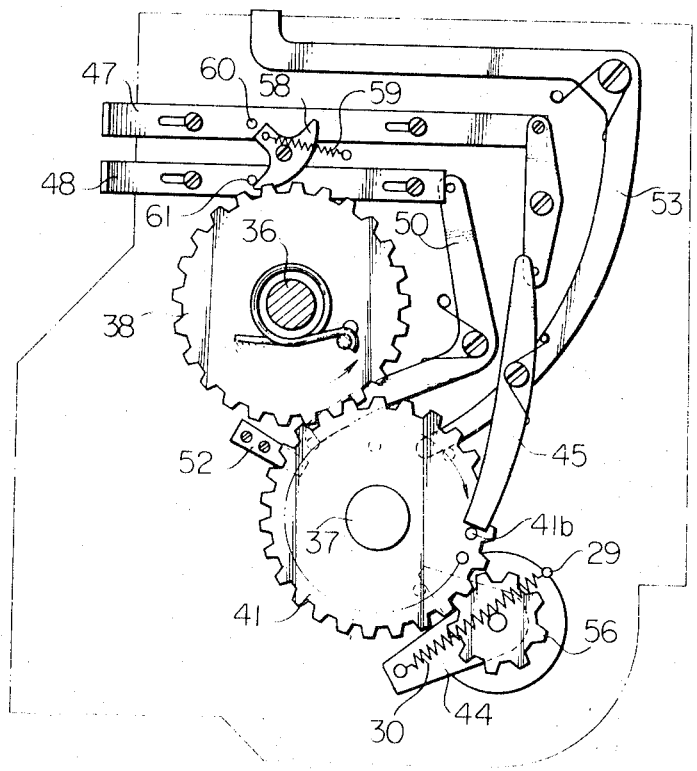
FIG. 8 is a schematic side view showing the arrangement of the actuating members and the driving and driven gears and the driving pinion of the film feed means of FIG. 6.

As shown in FIG. 8, T-shaped stopper member 58 is pivotally mounted at about the center thereof on the side wall of body 8 between members 47, 48. Tension spring 59 is secured at its one end to the outer end of the stem of member 58 while the other end is secured to a stationary point of body 8 at a position opposite to the side the stem of member 58 extends so that member 58 is urged in the clockwise direction by spring 59 when the same is rotated in the same direction while member 58 is urged in the anticlockwise direction by spring 59 when it is rotated in the anticlockwise direction over the dead point of spring 59.

Pin 60 is secured to actuating member 47 and pin 61 is secured to stationary member 48. The configuration of stopper member 58 is so determined that a wing portion of T-shaped member 58 abuts against pin 61 when the same is rotated in the clockwise direction so that it is held in the position rotated in the clockwise direction while the outer end of the stem of member 58 is located in the path of movement of pin 60 so that pin 60 abuts against the outer end of the stem of member 58 when member 47 is moved inwardly thereby preventing the inward movement thereof.

When member 48 is moved inwardly, pin 61 abuts against the wing portion of member 58 so that the same is rotated in the anticlockwise direction and held in its rotated position by the abutment of the other wing portion of member 58 against pin 60 even though member 48 is returned to its initial position as shown in FIG. 9. Thus, member 47 is allowed to be moved inwardly once member 48 is actuated prior to the actuation of member 47. After member 47 is actuated, stopper member 58 is again rotated and held at the position shown in FIG. 8 at which member 47 is prevented from being actuated unless member 48 is actuated.

View finder 14 is shown as being an eye-level finder. However, chest-level finder may be mounted on the camera in place of the eye-level finder.

Figure 14:
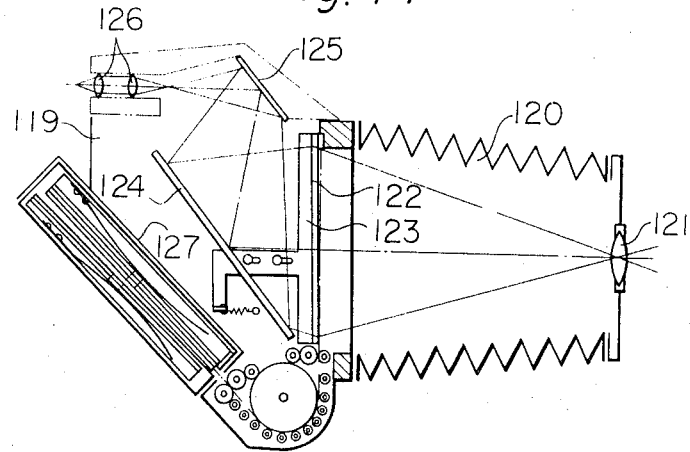
FIG. 14 is a schematic sectional view showing another embodiment of the photographic camera of the present invention.

FIG. 14 shows another embodiment of the present invention on which a single film cassette is detachably mounted for supplying the unexposed film sheets one by one and receiving the exposed film sheets.

As shown in FIG. 14, the camera comprises main body 119, bellows 120 mounted on body 119 and taking lens 121 mounted on the forward end of bellow 120. View finder 126 and reflecting mirrors 124, 125 are provided in body 119 in like manner as those shown in FIG. 1.

The film cassette is detachably mounted in the cassette mounting recess 127 located in the rear wall of body 119 and extending in inclined direction with the forward end of member 127 directed downwardly.

Figure 19:
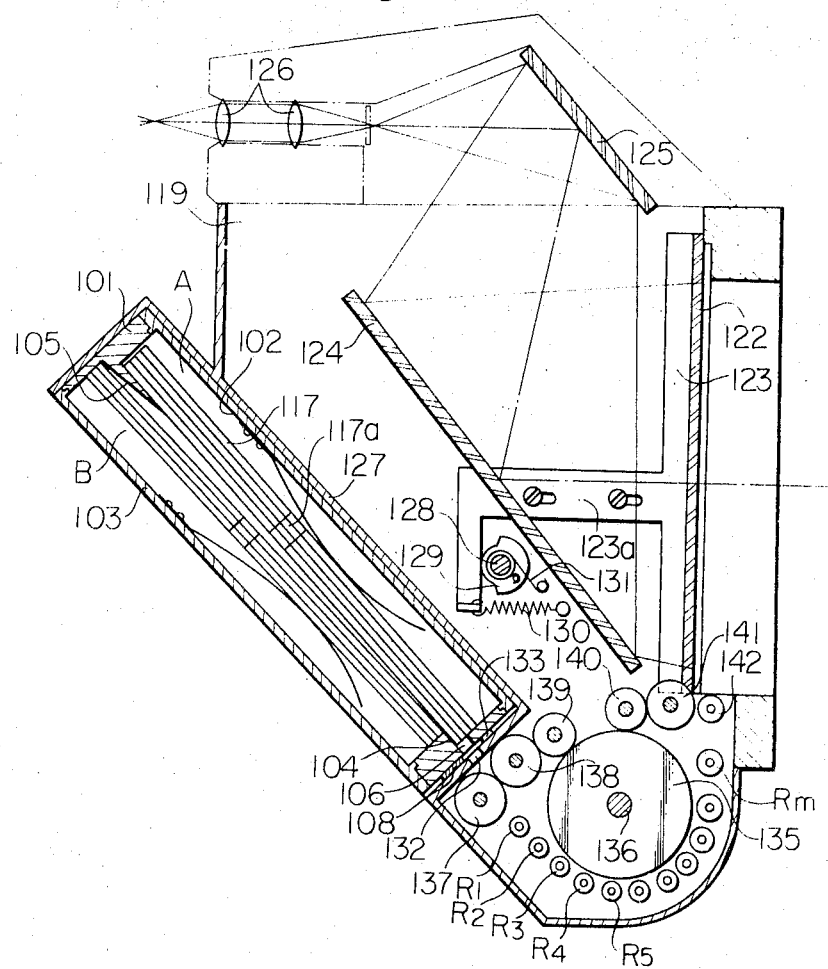
FIG. 19 is a schematic sectional view showing the arrangement of the film feed means provided in the camera of FIG. 14.

The film cassette shown in FIG. 14 comprises main frame 101 of relatively thin rectangular form having opened upper and lower openings. The upper opening is closed by upper lid 102 hinged to frame 101 and provided with leaf springs 102a at its inner surface while the lower opening is closed by lower lid 103 hinged to frame 101 and provided with leaf springs 103a at its inner surface as shown in FIGS. 16 and 17. An elongated opening 106 for passing the film sheet therethrough is provided in one end wall of frame 101 and a ledge 104 is formed in the inside surface of the end wall, the upper surface of ledge 104 being in flush with the lower inner surface of opening 106 as shown in FIG. 19. Another ledge 105 projects inwardly from the inner surface of the opposite end wall of frame 101 as shown in FIGS. 17 and 19. Ledges 104 and 105 divide the interior of the cassette into two compartments A, B, A being for supplying new film sheets while B is for receiving the exposed film sheets.

The end wall having opening 106 is provided with vertical slots 107 each having enlarged bottom portion in cross-section adjacent to the opposite ends of the end wall as shown in FIG. 17, upper end of each of slots 107 opening at the upper surface of the end wall and being provided with internal thread while the lower end of each of slots 107 is closed. Cover plate 108 for closing opening 106 is provided at its opposite ends with mating portions 108a slidably engageable with slots 107, and mating portions 108a are engaged in slots 107. Compression springs 109 are interposed between the lower closed ends of slots 107 and mating portions 108a and the upper ends of slots 107 are closed by set screws 110, respectively, so that opening 106 is normally closed by cover plate 108 by the action of springs 109, while opening 106 is opened when cover plate 108 is urged downwardly against the action of springs 109.

Figure 18:
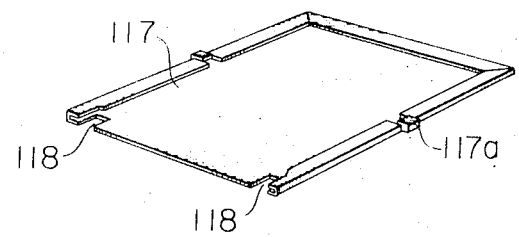
FIG. 18 is a perspective view showing the film holding frame used in the cassette of FIG. 16.

Each of the film sheets is housed in a film holding frame 117 shown in FIG. 18. Frame 117 is provided at its three sides including two longitudinal sides web portions bent back upon the base plate with clearance held therebetween for holding three sides of the film sheet in the clearance. Projection 117a is provided at the intermediate portion of each of the longitudinal sides of frame 117, the actuation of which will be described later. A pair of cut-out portions 118 is formed at the side of the base plate of frame 117 where no web portion is provided near the opposite ends of side, the operation of which will be described later.

An elongated recess 111 is provided in the inner surface of each of the longitudinal side walls of frame 101 extending lengthwise of the walls.

Slidable piece 112 is slidably received in each of recesses 111 and pin 113 secured to piece 112 protrudes outwardly beyond the side wall through elongated hole 115 formed in the side wall, while set screw 114 having a head is screwed to piece 112 from the exterior of the side wall through elongated stepped hole 116 so that the head of screw 114 will not project outwardly of the side wall, thereby guiding piece 112 lengthwise in recess 111.

Figure 21:
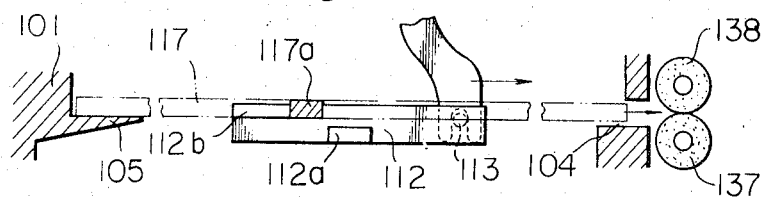
FIG. 21 is a fragmentary view showing the manner how the film holding frame is actuated by the actuating lever of FIG. 20.
Figure 22:
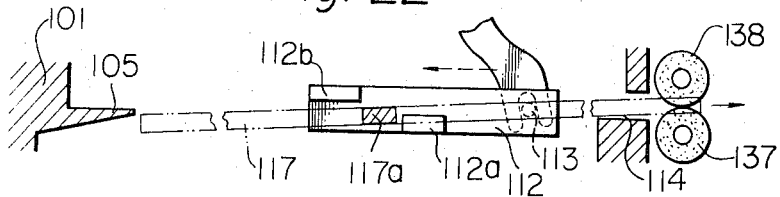
FIG. 22 is a view similar to FIG. 21 but showing the film holding frame in its different phase of operation from that of FIG. 21.

Projections 112a and 112b are formed in the inside surface of each of pieces 112 at the relative positions as shown in FIGS. 17, 21 and 22.

A plurality of frames 117 housing therein an unexposed film sheet are supported by ledges 104 and 105 and stacked in compartment A of the cassette with the emulsion surface of the film sheet facing downwardly. Leaf springs 102a urge the stacked film holding frames 117 downwardly so that the lowermost frame 117 is aligned with opening 106.

Figure 15:
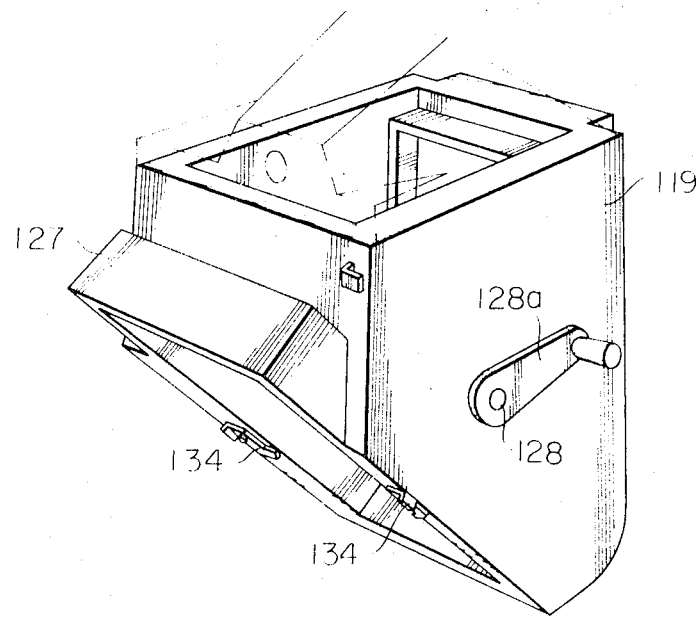
FIG. 15 is a perspective view showing the camera of FIG. 14.

The cassette as described above is loaded in cassette mounting recess 127 as shown in FIGS. 15 and 19 and locked in position by locking members 134.

The inside end wall of recess 127 is formed with an opening 132 and projections 133 in the inner surface of the end wall. The positions of projections 133 and opening 132 are so determined that, when the cassette is loaded in recess 127 in position, projections 133 abut against portions 108a so that cover plate 108 is moved out of opening 106 against the action of springs 109 so as to communicate opening 106 with opening 132 in alignment with each other.

An exposure frame is provided in front of a ground glass plate 122 for focusing an image of the object formed by taking lens 121. Glass plate 122 is secured to a pair of mounting member 123 each having L-shaped projection 123a extending rearwardly from each member 123 as shown in FIG. 19. Each of L-shaped projections 123a is slidably mounted in body 119 by pin-slot engagement for the limited movement so that glass plate 122 can be shifted rearwardly for facilitating a film sheet to be located in front thereof for sharp focusing of the image thereon after the image is focused on glass plate 122. To this end, one end of spring 130 is secured to the tip of the bent portion of each of projections 123a while the other end is secured to a stationary point in body 119 to urge members 123 together with glass plate 122 forwardly. A shaft 128 is rotatably journaled in body 119 at the inside of the bent portion of L-shaped projections 123a and a pair of cams 129 fixedly secured to shaft 128 engage with the respective inside surfaces of the bent portions of projections 123a, respectively, so that, when cams 129 rotate, projections 123a are moved rearwardly by cams 129 against the action of springs 130 to retract glass plate 122 for clearing the space to introduce the film sheet therein for the proper focusing of the image thereon. A spring 131 is provided around shaft 128 so that shaft 128 is normally urged in the clockwise direction.

Now the film feed means incorporated in the camera shown in FIG. 14 will be described with reference to FIGS. 19 to 22. The film feed means is housed in a compartment defined by outer and inner side walls at the right hand side of body 119 as seen in FIG. 15.

A shaft 136 fixedly mounting thereon a major roll 135 is rotatably journaled in body 119 beneath glass plate 122 so that the rightmost portion of the periphery of major roll 135 is positioned substantially below the lower end of glass plate 122. A pair of feeding roll trains 37, 38, 39 each consisting of odd number of rolls are arranged adjacent to opening 132 with the nip of rolls 137, 138 in alignment of opening 132 while rolls 139 contact with major roll 135 so as to be driven thereby. The lateral spacing of the pair of roll trains 137, 138, 139 is made to correspond to the spacing of cut-out portions 118, 118 in film holding frame 117 so that the edge of the film sheet in frame 117 can be engaged between the nip of rolls 137, 138 when frame 117 is moved forwardly through openings 106 and 132 as described later.

Another pair of feeding roll trains 140, 141, 142 are provided adjacent to the lower end of glass plate 122 with the nip of rolls 141, 142 in alignment with the extention of the front surface of glass plate 122 while rolls 140 contact with major roll 135 to be driven thereby. The lateral spacing of the pair of roll trains 40, 41, 42 is made to correspond to that of roll trains 137, 138, 139.

A pair of guide roll trains $R_1-R_n$ are arranged around major roll 135 from the positions adjacent to rolls 137 to the positions adjacent to rolls 142, respectively, so that they guide the film sheet around major roll 135 from opening 132 to the lower end of glass plate 122 and vice versa.

Figure 20:
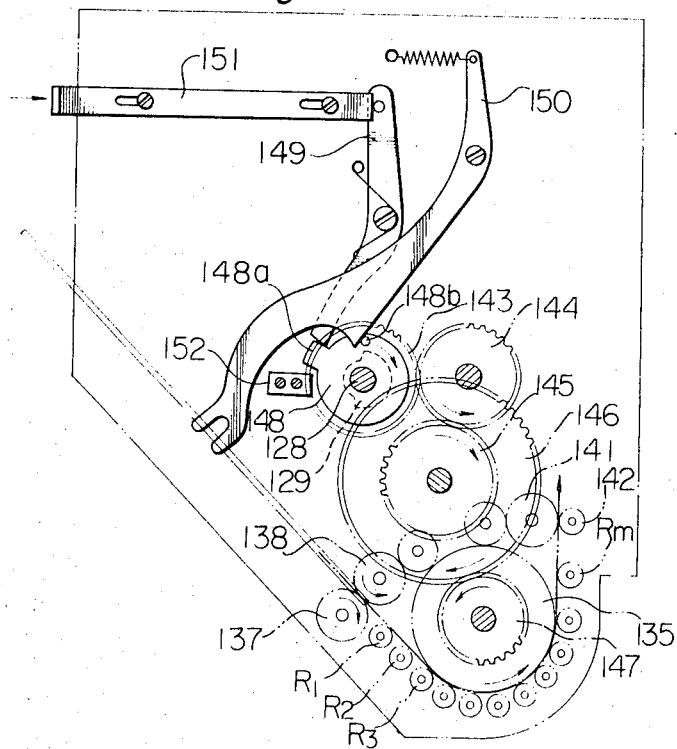
FIG. 20 is a schematic view showing the arrangement of the actuating member, actuating lever and gearing arrangement of the film feed means of FIG. 19.

Manually operable handle 128a is secured to the outer end of shaft 128 exterior of body 119 as shown in FIG. 15, and a pair of actuating discs 148 are fixedly secured to shaft 128 at either side of body 119. A projection 148a provided in one of discs 148 located at the right-hand side of body 119 as shown in FIG. 20 normally abuts against the lower side of stopper 152 by the action of spring 131 biasing shaft 128 in the clockwise direction so as to limit the clockwise rotation of shaft 128. At this position of shaft 128, the recessed portion of each of cams 129 contacts with the camming surface of each projection 123a so as to hold glass plate 122 in the forwardly shifted position for the focusing of the image thereon by the action of spring 130.

Shaft 128 fixedly mounts thereon a gear 143 which meshes with an idle gear 144 rotatably mounted in body 119. Gear 144 meshes also with small gear 145 rotatably mounted in body 119 and integral with large gear 146 which meshes with gear 147 fixedly secured to shaft 136 fixedly mounting major roll 135.

An actuating member 151 is slidably mounted on the side wall of body 119 by pin-slot engagement for the limited movement thereof. The inner end of member 151 abuts against a pin secured to the upper end of swingable lever 149 pivoted at its intermediate portion to body 119 and biased in the anticlockwise direction by a spring. The lower end of lever 149 will engage with projection 148a of one of discs 148 when shaft 128 is rotated by handle 128a in the anticlockwise direction so that projection 148a is arrested by the lower end of lever 149 as shown in FIG. 20 to prevent the clockwise rotation of discs 148, while spring 131 is kept energized.

A pair of swingable lever 150 are pivoted to body 119 at their intermediate portions at the respective sides of body 119 and biased in the anticlockwise direction by a spring.

A pin 148b is secured to each of discs 148 and pin 148b abuts against the raised portion intermediate of each of levers 150 when discs 148 are rotated in the anticlockwise direction to be arrested with projection 148a by the lower end of lever 149, so that levers 50 are arrested at a position slightly rotated in the clockwise direction against the action of the spring urging levers 50 in the anticlockwise direction.

Each of levers 50 is provided with a bifurcated portion at the lower end thereof which is adapted to engage with pin 113 of the cassette when the same is loaded in position in recess 127 so that pieces 112 are shifted forwardly by levers 150 when pins 148b disengage from levers 150 by the clockwise rotation of discs 148 as described later.

Starting the operation under the condition under which no film sheet is located in front of glass plate 122, handle 128l is first rotated in the anticlockwise direction substantially by one revolution until projection 148a is arrested by the lower end of lever 149 while gear train 143-147 is driven and spring 131 is energized by the rotation of shaft 128.

The rotation of shaft 128 in the anticlockwise direction once causes the raised portion of each cam 129 to contact with the camming surface of each projection 123a to move glass plate 122 rearwardly, but, when shaft 128 is rotated until projection 148a is arrested by the lower end of lever 149, the recessed portion of cams 129 contact with the camming surfaces so that glass plate 122 is held in the proper position for focusing the image thereon.

After proper focusing of the image is effected by means of view finder 126, actuating member 151 is manually moved inwardly. Then, lever 149 is rotated in the clockwise direction so that the lower end thereof is disengaged from projection 148a thereby causing discs 148 to rotate in the clockwise direction by the force of spring 131 together with cams 129 and gear 143.

The rotation of gear 143 causes major roll 135 to rotate in the anticlockwise direction through gear train 143 – 147 so that rolls 137, 138 as well as 141, 142 are rotated in the directions for feeding the film sheet nipped therebetween toward glass plate 122. At the same time, pin 148b of each disc 143 is disengaged from the respective lever 150 thereby causing levers 150 to swing in the anticlockwise direction by the action of springs so that pins 113 engaging with the bifurcated portions of the respective levers 150 are urged forwardly to move pieces 112 forwardly.

By the forward movement of pieces 112, the lowermost film holding frame 117 in the stack in compartment A of the cassette is urged to the right as seen in FIGS. 19 and 21 by the engagement of projections 117a of frame 117 with projections 112b of pieces 112 so that the forward end of frame 117 protrudes through openings 106 and 132 thereby permitting the forward end of the film sheet in frame 117 to be nipped between rolls 137, 138. Thus, the film sheet is fed along guide roll trains $R_I - R_n$ around major roll 135 toward the nip of rolls 141, 142 so as to be fed in front of glass plate 122. During the rotation of shaft 128, the raised portions of cams 129 contact with the camming surfaces of projections 123a to clear the space for introducing the film sheet. Therefore, the film sheet is safely fed in front of glass plate 122.

After the film sheet has been fed into proper position in front of glass plate 122, projection 148a abuts against stopper 152 to stop the rotation of major roll 135 and, at the same time, shutter release means coupled with the film feed means is actuated for the exposure of the film sheet. Shutter release means may be manually operated after major roll 135 is stopped.

When the lowermost frame 117 is moved forwardly, the tail end thereof moves apart from ledge 105 and is urged downwardly by spring 102a as shown in FIG. 22, so that frame 117 is received in compartment B when the same is moved back into the cassette as described below.

After the exposure of the film sheet has been effected, handle 128a is rotated in the anticlockwise direction for energizing spring 131 and driving gear train 143 – 147 until projection 148a is arrested by the lower end of lever 149. During the rotation of handle 128a, major roll 135 is driven in the clockwise direction so that the exposed film sheet is fed back into the lowermost frame 117 which now projects beyond openings 106 and 132 by rolls 41, 42 and rolls 137, 138.

About the end of rotation of discs 148 in the anticlockwise direction, pins 148b abut against lever 150 so that levers 150 moves pieces 112 backwardly by the engagement of projections 112a with projections 117a of frame 117 so that the projected frame 117 is moved back into compartment B of the cassette as shown in FIG. 22. Thus, the film feed means is in the condition ready for the next operation for the exposure by the action of actuating member 151.

We claim:

1. A photographic camera apparatus comprising:
A. a camera having a position for photographic exposure of a film sheet,
B. film cassette means attachable to and detachable from said camera for holding a plurality of sheets of unexposed film in a film supplying cassette position and adapted to hold a plurality of sheets of exposed film in a film receiving cassette position, and
C. manually operable roller means rotatable in a first direction for driving, guiding and feeding a sheet of film from the film supplying cassette position along a defined path in one direction into said position for photographic exposure and rotatable in a direction opposite said first direction to drive, guide, and feed said sheet of film back over part of said defined path in the direction opposite said one direction into said film receiving cassette position.

2. A camera apparatus according to claim 1 wherein the film supplying cassette position and the film receiving cassette position of said film cassette means respectively comprise first and second separate film cassettes each detachably mounted on said camera.

3. A camera apparatus according to claim 1 in which the film supplying cassette position and the film receiving cassette position of said film cassette means are both contained within a single integral cassette as separate compartments thereof.

4. Photographic camera having a detachable film cassette containing therein a plurality of unexposed film sheets to be exposed in said camera upon actuation of shutter release means of said camera, wherein the improvement comprises film feed means having a manually operable handle for energizing said film feed means each time said handle is actuated so as to permit one of said film sheets within said cassette to be fed to a position within said camera for the exposure thereof by the actuation of an actuating member of said film feed means, said film sheet, after having been exposed by the actuation of said shutter release means, being adapted to be withdrawn from said position for the exposure of the film sheet so as to be ready for the feeding of the succeeding one of said film sheets in said cassette to said position for the exposure of the film sheet, and further comprising a separate film cassette detachably mounted on said camera for receiving the exposed film sheet each time another actuating member of said film feed means is actuated prior to the actuation of said handle, and wherein said film feed means comprises a major feed roll driven in either of opposite two direction for feeding the film sheets toward said position for the exposure and toward said separate film cassette by said film feed means energized by said handle, a first set of roll trains located adjacent to the first mentioned caassette for feeding the respective film sheets out of said film cassette, a second set of roll trains located adjacent to said separate cassette for feeding the respective exposed film sheets into said separate film cassette, a set of guiding roll trains arranged around said major roll for guiding the respective film sheets therealong in cooperation with said major roll from said cassette to said position for the exposure and from said position for the exposure to said separate cassette, a set of feeding roll trains located adjacent to said position for the exposure and operably engaged with said major roll so as to feed the respective film sheets into or out of said position for the exposure of the film sheet depending upon the direction of rotation of said major roll, and a set of switching roll trains operably coupled with said major roll, said set of switching roll trains being moved to a first position to contact with said set of first roll trains when said first mentioned actuating member is actuated to drive said major roll in the direction for feeding the film sheet to said position for the exposure, so that said set of first roll trains drives the respective film sheets out of said film cassette so as to be fed into said position for the exposure, while said set of switching roll trains is switched to a second position to contact with said set of second roll trains when said another actuating member is actuated so as to drive said major roll in the direction for feeding the film sheet out of said position for the exposure so that the exposed film sheet is fed into said another film cassette.

5. Photographic camera having a detachable film cassette containing therein a plurality of unexposed film sheets to be exposed in said camera upon actuation of shutter release means of said camera, wherein the improvement comprises film feed means having a manually operable handle for energizing said film feed means each time said handle is actuated so as to permit one of said film sheets within said cassette to be fed to a position within said camera for the exposure thereof by the actuation of an actuating member of said film feed means, said film sheet, after having been exposed by the actuation of said shutter release means, being adapted to be withdrawn from said position for the exposure of the film sheet so as to be ready for the feeding of the succeeding one of said film sheets in said cassette to said position for the exposure of the film sheet, wherein said film cassette comprises two compartments in one of which said plurality of unexposed film sheets are housed while the respective exposed film sheets are received in the other of said two compartments each time said handle is actuated, and wherein each of said film sheets is housed in a film holding frame, and said film feed means comprises a major roll driven in the direction for feeding the respective film sheets toward said position for the exposure by said film feed means energized by said handle upon the actuation of said actuating member and driven in the direction for feeding the respective film sheets toward said film cassette by the actuation of said handle for energizing said film feed means, a first set of feed roll trains operably coupled with said major roll for feeding the respective film sheet out of said film holding frame containing the same when said actuating means is actuated to drive said major roll while said first set of feed roll trains is driven to feed the respective exposed film sheets into said film holding frame from which said film sheet has been withdrawn for the exposure thereof when said handle is actuated to drive said major roll in the direction for feeding the film sheet toward said film cassette, a second set of feed roll trains operably coupled with said major roll for feeding the respective film sheets into and out of said position for the exposure depending upon the direction of rotation of said major roll, a set of guiding roll trains arranged around said major roll for guiding the respective film sheets in cooperation with said major roll toward said position for the exposure and toward said film cassette, and a set of operating levers engageable with the respective film holding frame and actuated by the actuation of said actuating member for shifting and returning the respective film holding frame to and from a position at which the film sheet therein is allowed to be withdrawn and inserted therein by said set of first feed roll trains while said film holding frame is moved from said one compartment to said other compartment.

6. Photographic camera according to claim 4, wherein means is provided for preventing the actuation of said another actuating member prior to the actuation of said first mentioned actuating member after said film feed means is energized by the actuation of said handle, said means being switched so as to allow said another actuating member to be actuated each time said first mentioned actuating member has been actuated after the energization of said film feed means.

* * * * *